Oct. 29, 1929.  R. S. LANGDON  1,733,544
STEERING MECHANISM FOR TRAILERS
Filed Aug. 16, 1928   4 Sheets-Sheet 1

Inventor
Robert S. Langdon
By his Attorney F. H. Gibbs

Oct. 29, 1929.    R. S. LANGDON    1,733,544
STEERING MECHANISM FOR TRAILERS
Filed Aug. 16, 1928    4 Sheets-Sheet 2
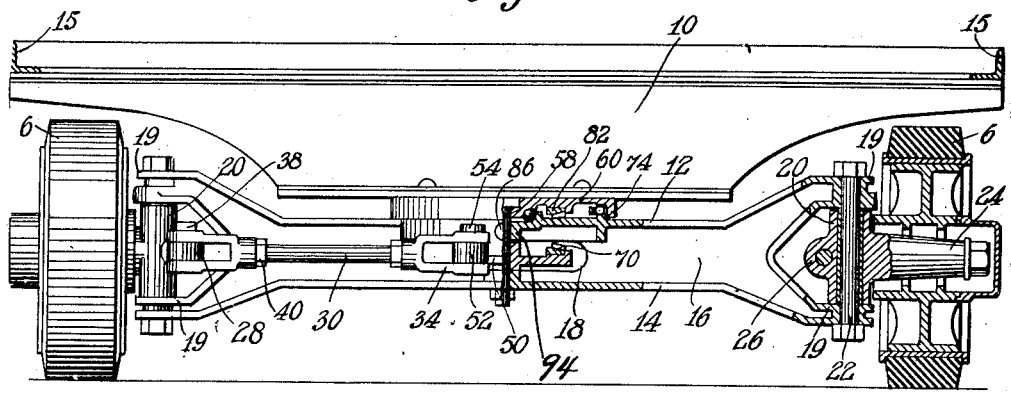
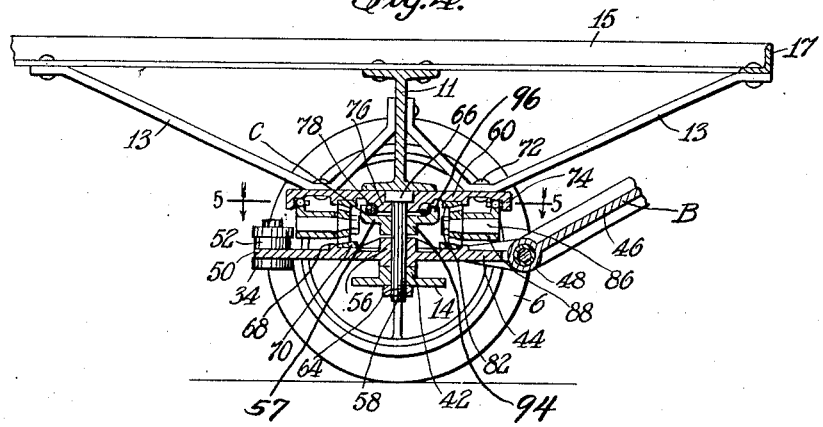
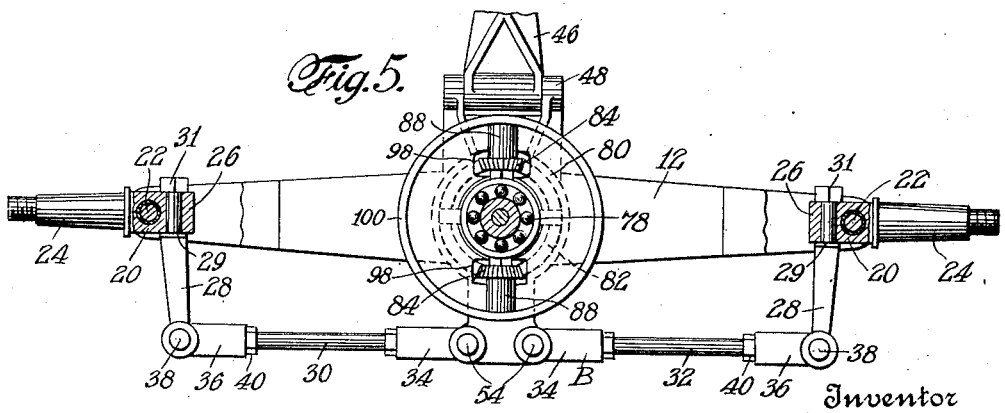
Inventor
Robert S. Langdon
By his Attorney

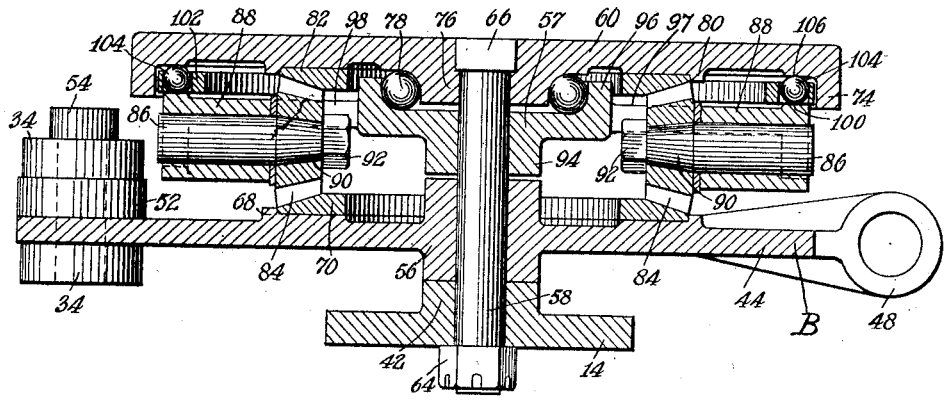
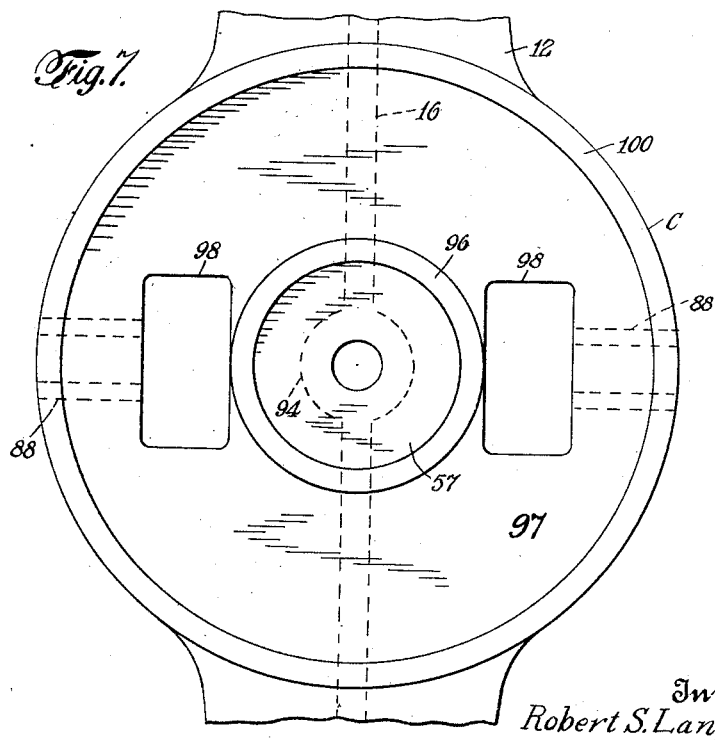

Oct. 29, 1929.   R. S. LANGDON   1,733,544
STEERING MECHANISM FOR TRAILERS
Filed Aug. 16, 1928   4 Sheets-Sheet 4
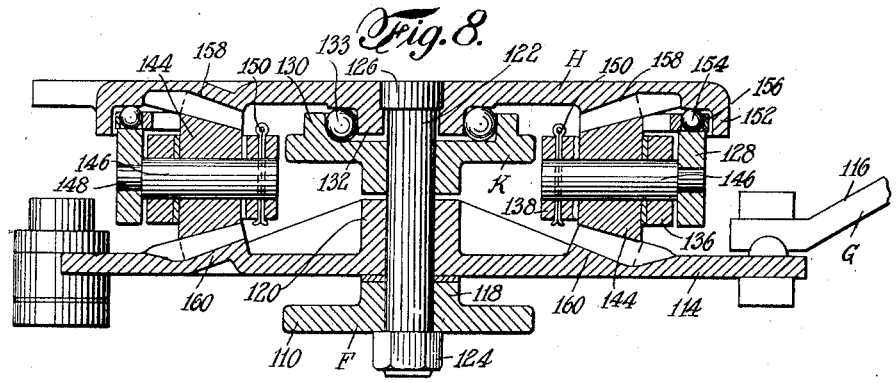
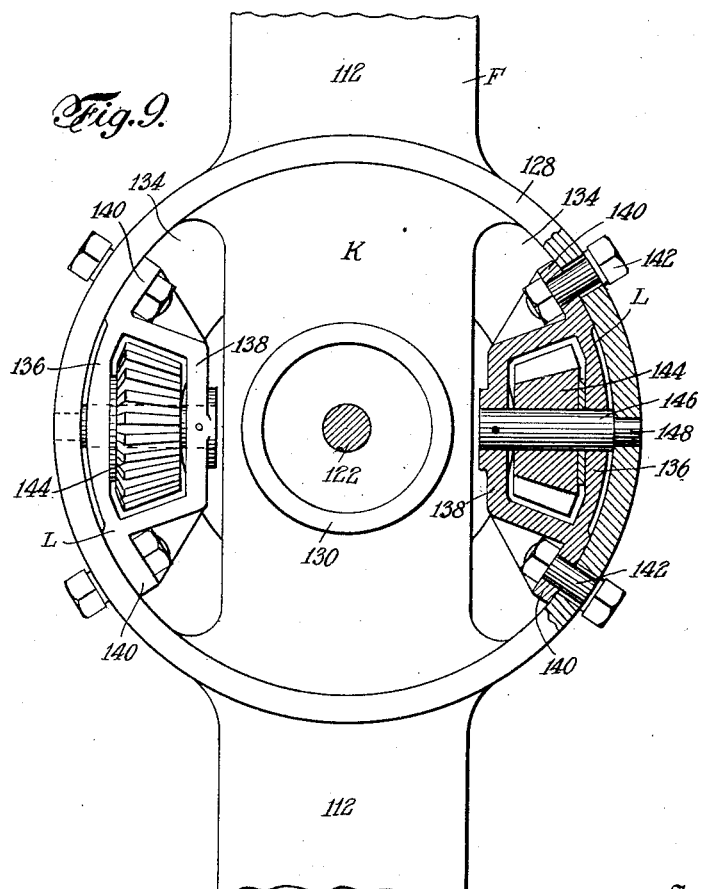
Inventor
Robert S. Langdon
By his Attorney F. H. Libbs Patented Oct. 29, 1929

1,733,544

UNITED STATES PATENT OFFICE

ROBERT S. LANGDON, OF SEATTLE, WASHINGTON, ASSIGNOR TO PACIFIC CAR AND FOUNDRY COMPANY, OF SEATTLE, WASHINGTON, A CORPORATION OF WASHINGTON

STEERING MECHANISM FOR TRAILERS

Application filed August 16, 1928. Serial No. 299,970.

This invention relates to vehicles and has particular reference to trailers for attachment to another vehicle for movement therewith.

One object of the invention is the provision of a new and improved steering mechanism for vehicle trailers.

In vehicle trailers, it is desirable to have a steering mechanism so formed as to permit the trailer to turn in as small a radius as possible. With the usual type of trailer, it has been found that when the load carried thereby is unbalanced and said trailer is turned at a comparatively great angle such, for example, as an angle of 90°, it frequently occurs that the trailer is upset. It is, therefore, desirable to provide a trailer which combines the features of capability of turning in a short radius with stability to prevent upsetting, and this, therefore, is another object of the present invention.

A still further object of the invention is the provision of a steering mechanism for trailers in which the steering wheels of said trailer are moved to varying degrees to accord with the turning radius of the trailer and in accordance with the direction of travel of a vehicle to which it is attached.

Another object of the invention is the provision of a trailer having a steering mechanism therefor which combines the features of a swivelling or dirigible axle with wheels pivoted to the ends thereof.

As another object of the invention, the same contemplates the provision of a vehicle having steering front wheels pivotally mounted or carried by the ends of an axle, which latter is swivelly secured to the vehicle; the steering wheels, when moved to change the forward direction of the vehicle being so mounted that they assume a position tangential to the circumference of the turning radius, which is the center of either of the rear wheels of the vehicle dependent upon the direction of change of the steering wheels.

Other objects and advantages of this invention will be apparent from the following description taken in conjunction with the accompanying drawings in which:

Fig. 3 is a rear view, partly in section, of the steering axle of the trailer taken on the line 3—3, Fig. 2, the figure also showing a body bolster in elevation;

Fig. 4 is a detail sectional view taken on the line 4—4 of Fig. 1, the parts being shown enlarged;

Fig. 5 is a sectional view on the line 5—5 of Fig. 4, the wheels being omitted;

Fig. 6 is a detail view of the fifth-wheel casting;

Fig. 7 is an enlarged fragmentary top plan view of the axle at substantially the center thereof;

Fig. 8 is a sectional view similar to Fig. 6 but showing a modified form of the invention, and Fig. 9 is an enlarged fragmentary top plan view of the axle shown in Fig. 8, certain parts being shown in section.

Figure 1:
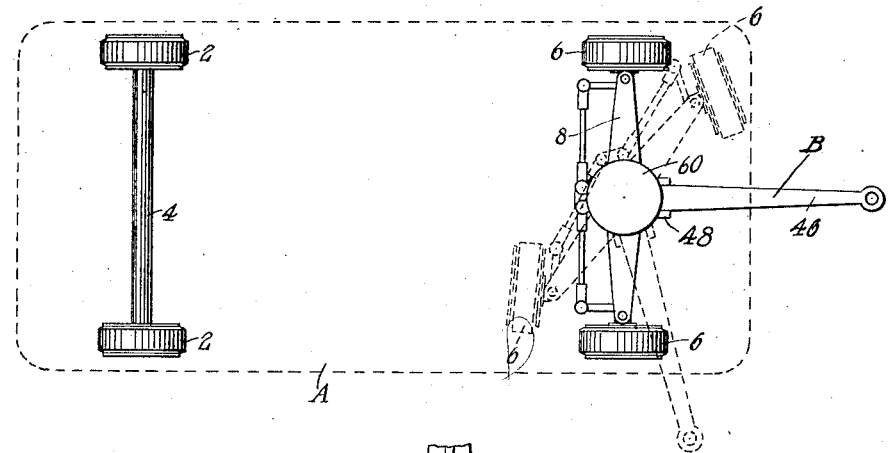
Figure 1 is a top plan view of the trailer, the body thereof being shown diagrammatically, and the steering axle being shown both in full lines and in dotted lines; the latter to indicate a steering position of the wheels when the vehicle is changing direction.
Figure 2:
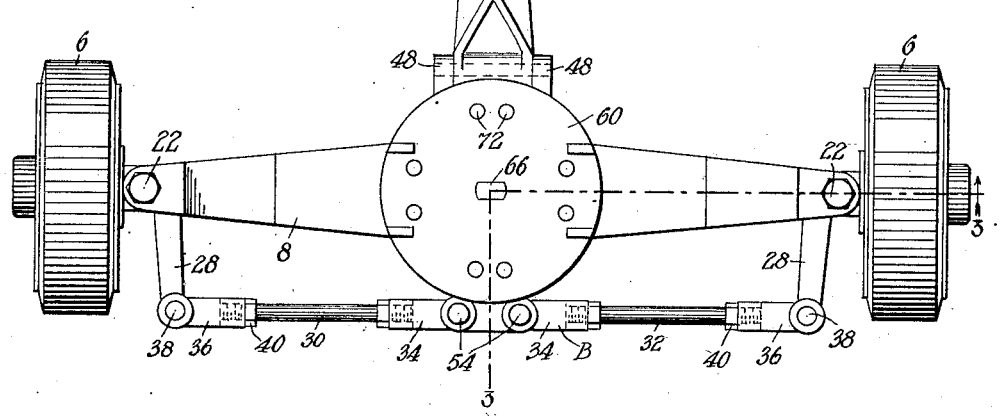
Fig. 2 is a top plan view of the steering wheels and steering axle.

Referring now more particularly to the drawings in which similar characters of reference designate similar parts in the several views, the trailer comprises a body diagrammatically indicated generally at A, having rear wheels 2 mounted on a rear axle 4, and front wheels 6 carried on a front axle 8 which latter is pivotally or swivelly connected as hereinafter described to a body bolster shown in Figs. 3 and 4 and indicated at 10. The bolster is shown as comprising substantially an I-beam 11 and reinforcing plates 13 which latter are connected to the side sills and end sills 15 and 17 respectively, and to the I-beams 11, but the illustration of this bolster is merely by way of example, as obviously any preferred or desired type of bolster may be employed within the spirit of the present invention, and the present invention is not restricted to the specific type of bolster indicated.

The front axle is substantially I-shaped in cross section, being provided with the upper and lower flanges or chords 12 and 14 respectively, and a connecting web 16. The web is cut away intermediate the ends of the axle to form an elongated opening 18, and the ends of the axle are bifurcated or forked to provide the oppositely arranged bearing portions 19 which receive steering knuckles 20 pivotally mounted on king pins 22 which extend through the bearing portions 19 and the knuckles as clearly shown in Figs. 3 and 5. The knuckles 20 carry stub axles 24 upon which the steering wheels 6 heretofore mentioned are mounted in any suitable manner, and the knuckles are further provided with apertured lugs 26 into which the forward ends of steering arms 28 extend and are secured, as clearly shown in Fig. 5. The steering arms 28 each have a reduced end which extends through the lugs 26 and said reduced end defines a shoulder 29 for an obvious purpose; nuts 31 securing the arms 28 in the lugs.

The steering arms 28 extend rearwardly from the axle and their free ends are connected by a steering rod indicated generally at B and comprising the oppositely arranged sections 30 and 32, the inner and adjacent ends of which are each secured within transversely slotted clevises 34. The outer ends of the steering arms 28 are secured within yokes 36 by suitable pins 38, and the outer ends of the sections 30 and 32 extend into said yokes, as clearly shown in Fig. 5. For adjusting the relative angular relation of the stub axles 24, the sections 30 and 32 may be adjusted within their respective clevises 34 and the yokes 36. Preferably the sections 30 and 32 are threadedly engaged within the yokes 36, and their clevises 34, but obviously various other means of connecting the sections 30 and 32 to said yokes and clevises may be employed, if desired. With the present arrangement, however, after the sections 30 and 32 have been adjusted to properly position the stub axles 24 with respect to each other, suitable binding nuts 40 are provided for retaining the stub axles in their adjusted relative angular relation, as will be apparent.

Referring now to Fig. 4, it can be seen that the web of the axle 8 adjacent and below the opening 18 is provided with an integral embossment 42 defining a seat for the rear section 44 of a sectional steering lever B which is arranged through the opening 18; the front section 46 thereof being hingedly connected to said rear section as shown at 48. The section 44 may be a casting and is formed with the extended rear end 50 having an integral bearing lug 52 to which the clevises 34 are connected by the pins 54.

The rear section 44 of the lever B is provided with an apertured centering boss 56 which seats on the embossment 42 and is pivotally connected thereto and hence to the axle by a king pin 58 which extends through a center plate 60, the axle 8, the boss 56 and said embossment 42, a securing nut 64 being provided at the lower end of the king pin for an obvious purpose and the center plate 60 is recessed to receive the king pin head 66.

The section 44 of the steering lever is provided with a circular flange 68 arranged concentrically with respect to the boss 56 which provides a centering means for an annular rack 70 which may, if desired, be secured in any suitable manner to the steering lever section 44. The center plate 60 is of the form shown clearly in Figs. 4 and 6, being substantially circular in shape and secured to reinforcing plates 13 by suitable fasteners such as the rivets 72 and having an annular marginal retaining flange 74.

The axle 8, adjacent the opening 18 therein, and above the latter, is formed with an enlarged substantially circular plate portion shown clearly in Fig. 7 and designated generally as C. This plate portion C is preferably formed with the upper chord 12 of the axle, as clearly shown in Fig. 3, and comprises a substantially circular plate 57 provided with an upwardly extending annular flange 96 and a depending hub 94 apertured as clearly shown in Fig. 6 and through which aperture the pin 58 extends. The upwardly extending flange 96 overlaps the depending boss 76 of the center plate 60 and provides a retaining means for the hereinbefore mentioned ball bearing elements 78. Extending outwardly from the plate 57 is a continuous web 97 the marginal edge of which is provided with an upstanding circumferential flange 100 which may be machined and which supports a circular bearing cage 102 having the bearing elements 104 therein which work on said flange 100 and on the under surface of the center plate 60 at a bearing surface 106 thereof.

The web 97 has preferably formed integral therewith opposed bearing portions 88 which support pinion shafts 86, the inner ends of which are tapered and extend beyond the inner ends of said bearings 88 and carry the pinions 84. The extreme inner ends of the shafts 86 are threaded to receive securing nuts 92 for retaining the pinions 84 on their shafts. The pinions 84 are adapted to mesh with the rack 70 and they extend through oppositely arranged openings 98 formed in the web 97 and mesh with the rack 82 secured to the center plate 60.

Figs. 8 and 9 disclose modified forms of the invention, but the thought present in the remaining figures of the drawings is also present in the modified form, and now referring to Fig. 8, the axle is designated generally at F having a lower chord 110 and an upper chord 112 (see Fig. 9). Like the axle shown clearly in Fig. 3, the axle shown in Figs. 8 and 9 is provided with a recess through which the rear end 114 of a steering lever G extends, the latter being provided with a forward end 116. The rear end 114 of the steering lever is supported on a lug 118 formed integral with the axle and as a part of the web thereof, and the rear end 114 of the steering lever is provided with an apertured lug 120 through which and through a center plate H and the axle, a pin 122 extends; the rear end 114 of the steering lever being pivoted by reason of the pin 122. For securing the pin against displacement a nut 124 is provided and the head 126 of the pin is preferably countersunk within the center plate H as shown clearly in Fig. 8.

Referring now more particularly to Fig. 9, the upper chord of the axle F is provided with an enlarged substantially circular plate portion indicated generally at K and which is provided with an annular flange 128 which is of substantial depth, as clearly shown in Fig. 8. The plate portion K is also provided with a concentrically arranged annular flange 130 which overlaps a depending lug 132 formed on the lower face of the center plate H; the lug 132 and the flange 130 being spaced to provide a race therebetween for the reception of suitable bearing elements such as the balls 133.

The plate portion K of the axle is provided with oppositely arranged openings which are preferably of the form shown in Fig. 9 and which are designated at 134. These openings are adapted to receive castings L which are provided with spaced portions 136 and 138 respectively and with oppositely extending attaching ears 140 by which the castings L may be secured to the inner face of the flange 128 by means of the bolts 142. The portions 136 and 138 of the castings L define pinion receiving spaces in which the pinions 144 are mounted on axles 146 which extend through the portions 136 and 138 of the castings and have a reduced end 148 arranged in the flange 128 of the plate portion K. For securing the axles 146 against displacement, suitable fasteners such as the cotters 150 may be employed, see Fig. 8. The center plate H is provided with a depending annular flange 152 and the lower face of the center plate which is adjacent the flange 152 may be machined, if desired, to afford an easy working surface for bearing elements 154 in a bearing cage 156; the bearing cage, or more particularly the bearing elements 154 thereof being seated on the upper surface of the flange 128, which upper surface may be machined if desired.

The center plate H is further provided with an integrally formed annular rack 158 with which the teeth of the pinions 144 are adapted to mesh, and the upper surface of the rear end 114 of the steering lever G is also provided with an integral rack 160 with which the pinions 140 are adapted to mesh. The drawings disclose the racks 158 and 160 as being formed integral with the center plate and the section 114 of the steering lever G respectively, but this is merely by way of example, as obviously, if desired, the center plate and section 114 of the steering lever may each be provided with separate and independent racks which can be secured in any suitable or desirable manner to these respective parts.

From the above description, it is believed that the construction of the device of the present invention will be fully apparent to those skilled in the art to which it appertains, but attention is called to the fact that when the steering lever B is shifted clockwise as shown in Fig. 1, the lever will pivot about the king pin 58 thus moving the rear end thereof correspondingly and changing the relative angular relation of the stub axles 24 and the steering wheels to the position shown in dotted lines in Fig. 1 and in which it can be readily seen that the steering wheels 6 are moved to assume a position tangential to an arc drawn from a point located on the axis of the rear wheels or an extension thereof, thereby providing a construction in which it will be apparent that the trailer may be turned completely around in a space just double the length of the distance between the front and rear wheels.

Immediately upon pivoting or turning of the steering lever B, it will be apparent that the pins 84 will be rotated by reason of the turning of the rack 84 with respect thereto; the pinions rotating in the racks 82 and 70. Upon rotation of these pinions 84, it will be obvious that the axle 8 will be pivoted or swivelled on the king pin 58 in a direction corresponding to the turning direction of the wheels 6, as also shown in Fig. 1, but to an extent less than the pivotal or swivelling movement of the wheels 6.

From the above description of Figs. 8 and 9, it will be apparent that the device shown in said figures will operate in accordance with the description given just above with reference to the remaining figures of the drawings, and no further description is believed to be necessary. However, with the device shown in Figs. 8 and 9, it can be readily seen that should one of the castings L become fractured or broken, it may be easily and quickly replaced and the device restored to service. However, the thought of the device shown in Figs. 8 and 9 is similar to that shown in the remaining figures of the drawings.

The device of the present invention has been shown as specifically applied to a carrier termed a trailer, but it will be apparent that the invention outlined herein is applicable to any vehicle in which it is desirable to provide a swivelling front axle and swivelling wheels connected thereto; such, for example, as a motor truck or other motor vehicle, the invention providing a structure in which the vehicle will not be upset in turning even though the same be loaded in an unbalanced manner.

The drawings disclose the preferred embodiment of the invention, but it is to be understood that they are for illustrative purposes only and that various changes in the form and proportions of the device may be made within the scope of the appended claims without departing from the spirit of the invention.

What is claimed is:

1. In a trailer, a body bolster, a front axle, wheels pivotally connected to the axle to swing laterally with respect thereto, a steering rod for swinging the wheels on their pivots, a steering lever pivotally connected intermediate its ends to said axle and having its rear end connected to the steering rod, a center plate secured to the bolster and supported by the axle and provided with a rack, a rack formed on the steering lever and a pinion journaled in the axle and meshing with the said racks whereby upon lateral shifting of the steering lever the wheels are turned on their pivots and said pinion is rotated to swing the axle.

2. In a trailer, a body bolster, a dirigible axle, wheels pivotally secured thereto, a steering rod for swinging said wheels, a steering lever supported by the axle and having its rear end connected to said steering rod, a center plate secured to the bolster, oppositely arranged racks secured to the center plate and steering lever respectively, and pinions supported by the axle and meshing with said racks whereby upon shifting of the steering lever to swing the wheels the pinions are actuated to swing the axle in the same direction.

3. In a vehicle, a body bolster, a dirigible axle, wheels pivotally secured thereto, a steering rod for swinging the wheels, a steering lever extending through and pivotally secured to the axle and connected at its rear end to the steering rod, an annular rack supported by the steering lever, an embossment formed with the upper portion of the axle and having opositely arranged depending bearings, pinion shafts in the bearings, pinions mounted in the shafts and meshing with the annular rack, a center plate supported by the axle and having an annular rack with which said pinions mesh, and bearing elements supported by the axle embossment.

4. In a vehicle, a dirigible front axle comprising an I-beam having an elongated opening in the web thereof and a plate portion formed with the upper chord, depending bearings formed with said plate portion, an internal annular flange formed with said plate portion, and a hub depending from the plate portion and arranged in the opening.

5. In a trailer, an I-beam providing an axle and having an opening in the web thereof, a steering lever extended through the opening, a king pin arranged through the axle and lever for permitting lateral shifting of the lever, wheels swiveled to the axle, a steering rod connecting said wheels and to which the rear end of the lever is connected, oppositely arranged bearings formed with the upper flange of the axle, pinions supported by said bearings and extending through the upper flange of the axle, a center plate above the axle and through which the king pin extends, bearing elements supported by the axle on which the center plate rests, and oppositely disposed racks on the steering lever and center plate respectively engaged by said pinions whereby lateral shifting of the steering lever shifts the wheels and axle in the same direction in relatively different amounts.

6. In a vehicle, a dirigible front axle having a plate portion intermediate its ends provided with oppositely arranged apertures, wheels pivotally secured to the ends of the axle, a steering lever pivotally connected to the axle and operatively connected to the wheels to swing the latter, a center plate supported by the axle, pinion brackets carried by the axle at the plate portion thereof, pinions supported thereby, and oppositely disposed racks formed on the center plate and steering lever respectively with which the pinions engage whereby shifting of the steering lever shifts the wheels on their pivots and also actuates the pinions to swing the axle on its pivot in the same direction as that in which the wheels are shifted.

In witness whereof I have hereunto set my hand.

ROBERT S. LANGDON.